United States Patent
Moldoveanu et al.

(10) Patent No.: US 10,281,602 B2
(45) Date of Patent: May 7, 2019

(54) SYSTEM AND METHOD TO ACQUIRE ULTRA-LONG OFFSET SEISMIC DATA FOR FULL WAVEFORM INVERSION (FWI) USING UNMANNED MARINE VEHICLE (UMV)

(71) Applicant: WESTERNGECO LLC, Houston, TX (US)

(72) Inventors: Nicolae Moldoveanu, Houston, TX (US); Denes Vigh, Houston, TX (US); Surrinder Kapoor, Missouri City, TX (US); Sudhir Pai, Houston, TX (US)

(73) Assignee: WESTERNGECO L.L.C., Houston, TX (US)

( * ) Notice: Subject to any disclaimer, the term of this patent is extended or adjusted under 35 U.S.C. 154(b) by 185 days.

(21) Appl. No.: 15/312,677

(22) PCT Filed: Jun. 18, 2015

(86) PCT No.: PCT/US2015/036468
§ 371 (c)(1),
(2) Date: Nov. 21, 2016

(87) PCT Pub. No.: WO2015/195939
PCT Pub. Date: Dec. 23, 2015

(65) Prior Publication Data
US 2017/0205520 A1    Jul. 20, 2017

Related U.S. Application Data

(60) Provisional application No. 62/014,340, filed on Jun. 19, 2014.

(51) Int. Cl.
*G01V 1/38*     (2006.01)
*G01V 1/18*     (2006.01)
(Continued)

(52) U.S. Cl.
CPC ............ *G01V 1/189* (2013.01); *G01S 5/18* (2013.01); *G01S 19/14* (2013.01); *G01V 1/3808* (2013.01);
(Continued)

(58) Field of Classification Search
CPC .... G01V 1/189; G01V 1/3808; G01V 1/3843; G01V 1/3852; G01V 2210/1427;
(Continued)

(56) References Cited

U.S. PATENT DOCUMENTS 5,761,152 A  *  6/1998  Jacobsen ............ G01V 1/3808
                                                    181/110
6,288,973 B1     9/2001  Joynes
(Continued)

FOREIGN PATENT DOCUMENTS

EP        0154968 A2      9/1985
WO        2015/113031 A1  7/2015

OTHER PUBLICATIONS

International Preliminary Report on Patentability for the equivalent PCT application PCT/US2015/036468 dated Dec. 29, 2016.
(Continued)

*Primary Examiner* — Krystine E Breier
(74) *Attorney, Agent, or Firm* — Kevin B. McGoff

(57) ABSTRACT

A system and method for acquiring seismic streamer data is provided. Embodiments may include performing a marine seismic survey using an unmanned marine vessel having a power source configured to drive and provide propulsion to the unmanned marine vessel. Embodiments may further include acquiring one or more of long and ultra-long seismic survey data using a multi-dimensional seismic sensor array coupled with the unmanned marine vessel and providing the seismic survey data as a reduced data set that includes long and ultra long offsets.

19 Claims, 10 Drawing Sheets

(51) Int. Cl.
  *G01S 19/14* (2010.01)
  *G01S 5/18* (2006.01)
(52) U.S. Cl.
  CPC .......... *G01V 1/3843* (2013.01); *G01V 1/3852* (2013.01); *G01V 2210/1427* (2013.01); *G01V 2210/165* (2013.01); *G01V 2210/167* (2013.01); *G01V 2210/56* (2013.01)
(58) Field of Classification Search
  CPC ....... G01V 2210/165; G01V 2210/167; G01V 2210/56; G01S 5/18; G01S 19/14
  See application file for complete search history.

(56) References Cited

U.S. PATENT DOCUMENTS

| | | | |
|---|---|---|---|
| 6,424,920 B1* | 7/2002 | Osypov | G01V 1/362 |
| | | | 702/18 |
| 6,590,831 B1 | 7/2003 | Bennett et al. | |
| 7,411,863 B2* | 8/2008 | Toennessen | G01V 1/3808 |
| | | | 367/20 |
| 7,492,665 B2* | 2/2009 | Robertsson | G01V 1/3808 |
| | | | 367/40 |
| 8,104,346 B2 | 1/2012 | Paulson | |
| 8,488,409 B2* | 7/2013 | Hill | G01V 1/3808 |
| | | | 367/15 |
| 9,013,952 B2* | 4/2015 | Muyzert | G01V 1/3808 |
| | | | 367/15 |
| 9,019,797 B2* | 4/2015 | Goujon | G01V 1/364 |
| | | | 367/24 |
| 9,423,522 B2* | 8/2016 | Muyzert | G01V 1/3843 |
| 9,702,997 B2* | 7/2017 | Sava | G01V 1/303 |
| 2007/0223306 A1 | 9/2007 | Toennessen | |
| 2008/0080318 A1* | 4/2008 | Maxwell | G01V 1/16 |
| | | | 367/131 |
| 2009/0147619 A1 | 6/2009 | Welker | |
| 2010/0302900 A1* | 12/2010 | Tenghamn | G01V 1/38 |
| | | | 367/20 |
| 2011/0205839 A1 | 8/2011 | Sudow et al. | |
| 2012/0082001 A1 | 4/2012 | Welker et al. | |
| 2013/0135966 A1 | 5/2013 | Rommel et al. | |
| 2014/0160886 A1 | 6/2014 | Muyzert et al. | |
| 2017/0003408 A1* | 1/2017 | Moldoveanu | G01V 1/3817 |
| 2017/0075014 A1* | 3/2017 | Westerdahl | G01V 1/3852 |

OTHER PUBLICATIONS

Extended Search Report for the equivalent European patent application 15808952.4 dated Jan. 19, 2018.
International Search Report and the Written Opinion issued in the related PCT application PCT/US2015/036468, dated Sep. 11, 2015 (15 pages).
Denes Vigh, Jerry Kapoor, Nick Moldoveanu, Hongyan Li—Breakthrough acquisition and technologies for subsalt imaging, , Geophysics, Sep. 2011, vol. 76, No. 5, pp. WB44-WB51.

* cited by examiner

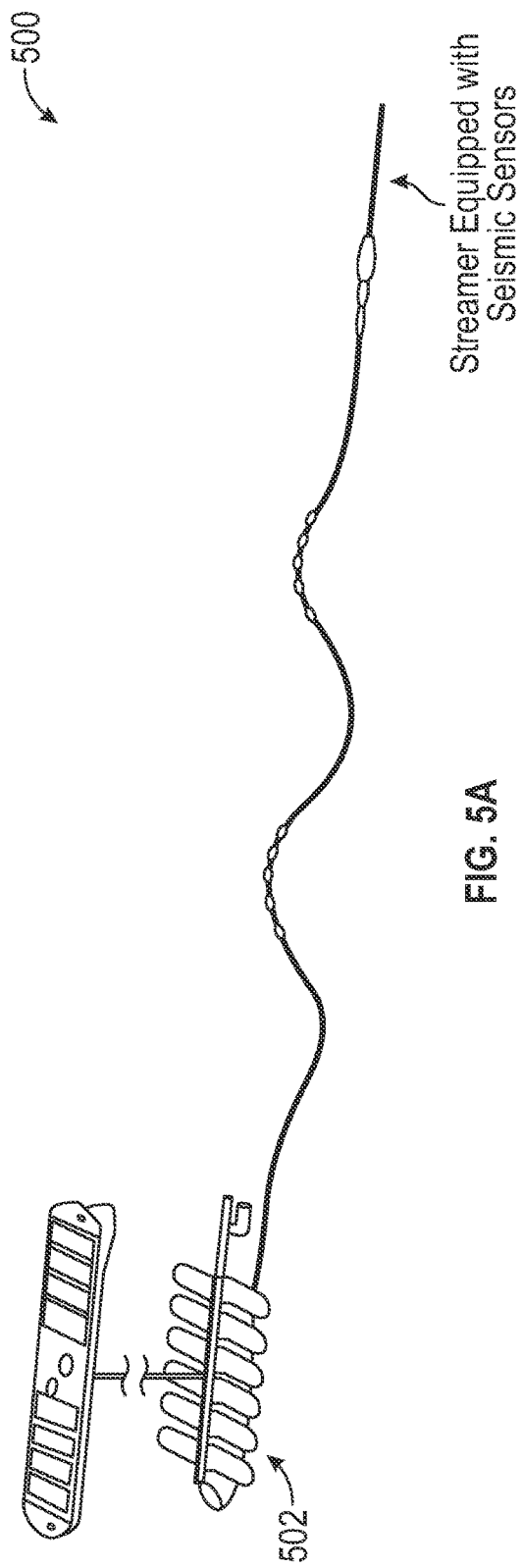
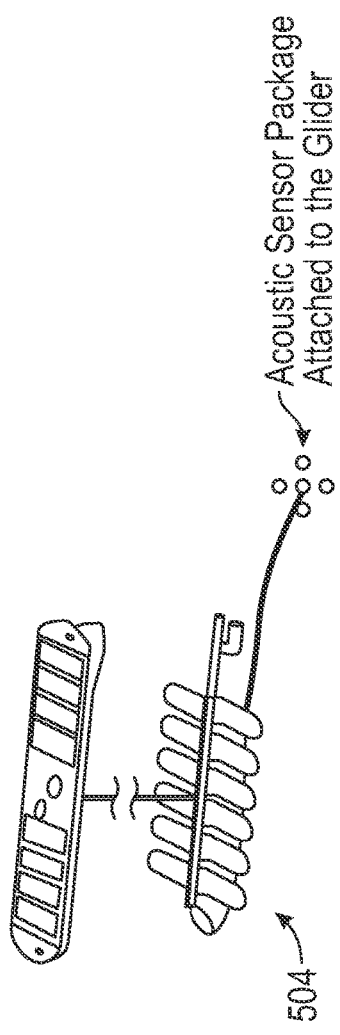
FIG. 5A
FIG. 5B

SYSTEM AND METHOD TO ACQUIRE ULTRA-LONG OFFSET SEISMIC DATA FOR FULL WAVEFORM INVERSION (FWI) USING UNMANNED MARINE VEHICLE (UMV)

CROSS REFERENCE TO RELATED APPLICATIONS

The present application claims priority to U.S. Patent Application No. 62/014,340 that was filed on Jun. 19, 2014, which is hereby incorporated by reference in their entirety.

TECHNICAL FIELD

The present application relates to marine seismic surveys and multi-dimensional sensor arrays.

BACKGROUND

Seismic data acquisition may be conducted by towing some number of streamer sections behind a vessel. The streamer sections may have varying types of construction and sensor mounting in the streamer. Data recorded on these streamers are stored in memory on the towing vessel.

Ocean bottom cable ("OBC") is another recording body used in seismic data acquisition. OBC differs from towed marine because the cables remain stationary on the sea floor and the data may be recorded either on a dedicated recording buoy or a recording vessel.

In both cases the length of cable sections is on the order of 100 m. The sections are connected together to make streamer lengths of up to 12 km. Cables of this length require electrical power to record and transmit data along the length of the cables. Further, the recording systems dedicated to store the acquired seismic data are complex and require well trained seismic observers to manage the acquisition and perform quality control of the data.

OBC surveys are between 3 and 5 times as expensive as towed marine surveys due to the time required to acquire the data. A vessel and trained crew is needed to deploy the cable and attach the data and power transmission cable to a buoy to be ready for data recording. This may take a considerable amount of time.

Towed marine streamer spreads may consist of between 6 and 12 streamers and are seldom shorter in length than 3 km. The large size of these spreads makes controlling the streamer locations difficult especially in the presence of ocean currents. This lack of control results in difficulty in maneuvering near stationary production platforms.

Full waveform inversion ("FWI") is a seismic inversion method used to derive an earth model from seismic data. The current FWI technology enables inversion for compressional velocities (Vp) and some anisotropic parameters, for example, Thompson's parameters (epsilon and delta). Long offset data (e.g., more than 12 km) or ultra-long offset data (e.g., more than 20 km) and very low frequencies (e.g., less than 3 Hz) are required for FWI to generate accurate velocity models. Acquisition of long and ultra-long offset towed-streamer marine seismic data is expensive, as this may involve very long streamers or additional source vessels.

SUMMARY OF DISCLOSURE

In one implementation, a system for acquiring seismic streamer data is provided. The system may include an unmanned marine vessel having a power source to drive and provide propulsion to the unmanned marine vessel. The system may further include a multi-dimensional seismic sensor array coupled with the unmanned marine vessel, wherein the multi-dimensional seismic sensor array may acquire long and ultra-long seismic survey data.

In some implementations, the unmanned marine vessel may be a wave-glider. The multi-dimensional seismic sensor array may include sensors selected from a group consisting of hydrophones, micro-electro-mechanical sensor ("MEMS") accelerometers, geophones, one or more pressure gradient sensors, and inclinometers. The system may further include a float associated with the unmanned marine vessel including a global positioning system ("GPS") receiver and a recording system configured to store and transmit the seismic survey data. The multi-dimensional seismic sensor array may be coupled with a sensor package or a streamer associated with the unmanned marine vessel. The unmanned marine vessel may acquire data during any type of towed streamer acquisition, like narrow-azimuth streamer acquisition or a dual coil full-azimuth towed streamer acquisition. The unmanned marine vessel may perform a stationary, dynamic, or hybrid deployment. The unmanned marine vessel may be an ocean bottom node. The ocean bottom node may include a pressure sensor, vertical geophone, horizontal geophone, recording system and/or accelerometers. The accelerometers may measure the acceleration in a plurality of directions.

In another implementation, a method for acquiring seismic streamer data during a seismic streamer survey is provided. The method may include performing a marine seismic survey using an unmanned marine vessel having a power source to drive and provide propulsion to the unmanned marine vessel. The method may also include acquiring long and ultra-long offsets seismic survey data using a multi-dimensional seismic sensor array coupled with the unmanned marine vessel. The method may further include providing the seismic survey data as a reduced data set that includes long and ultra long offsets.

In some implementations, the unmanned marine vessel may be a wave-glider or an ocean bottom node. The multi-dimensional seismic sensor array may include sensors such as hydrophones, micro-electro-mechanical sensor (MEMS) accelerometers, geophones, pressure gradient sensors, and inclinometers. The unmanned marine vessel may include a float having a global positioning system ("GPS") receiver and a recording system to store and transmit the seismic survey data. The multi-dimensional seismic sensor array may be coupled with a sensor package or a streamer associated with the unmanned marine vessel. In some embodiments, performing a marine seismic survey may include performing a narrow-azimuth streamer acquisition, a wide-azimuth streamer acquisition, a full-azimuth streamer acquisition, and/or a full-azimuth dual coil streamer acquisition. In some embodiments, transmitting the seismic survey data may include storing and transmitting seismic data for full waveform inversion ("FWI"), diving wave tomography, Kirchhoff type tomography, wave equation tomography, and/or Reverse Time Migration angle gathers. The method may further include processing the seismic survey data to perform a receiver deghosting operation using a pressure first order gradient. In some embodiments, performing a marine seismic survey may include performing the marine seismic survey using a plurality of unmanned marine vessels.

In yet another implementation, an Ocean Bottom Node for acquiring seismic streamer data is provided. The Ocean Bottom Node may include a housing and a multi-dimensional seismic sensor array coupled with the Ocean Bottom Node. The multi-dimensional seismic sensor array may acquire long and ultra-long seismic survey data. The multi-dimensional sensor array may include a pressure sensor, a vertical geophone, a horizontal geophone, a recording system, and/or accelerometers to measure the acceleration of particle velocity in a plurality of directions.

This summary is provided to introduce a selection of concepts that are further described below in the detailed description. This summary is not intended to identify essential features of the claimed subject matter, nor is it intended to be used as an aid in limiting the scope of the claimed subject matter.

BRIEF DESCRIPTION OF THE DRAWINGS

Embodiments of the present disclosure are described with reference to the following figures.

FIG. 5A-5B illustrates an example of an Unmanned Marine Vehicle ("UMV") in accordance with implementations of various techniques described herein;

Like reference symbols in the various drawings may indicate like elements.

DETAILED DESCRIPTION

Figure 1A:
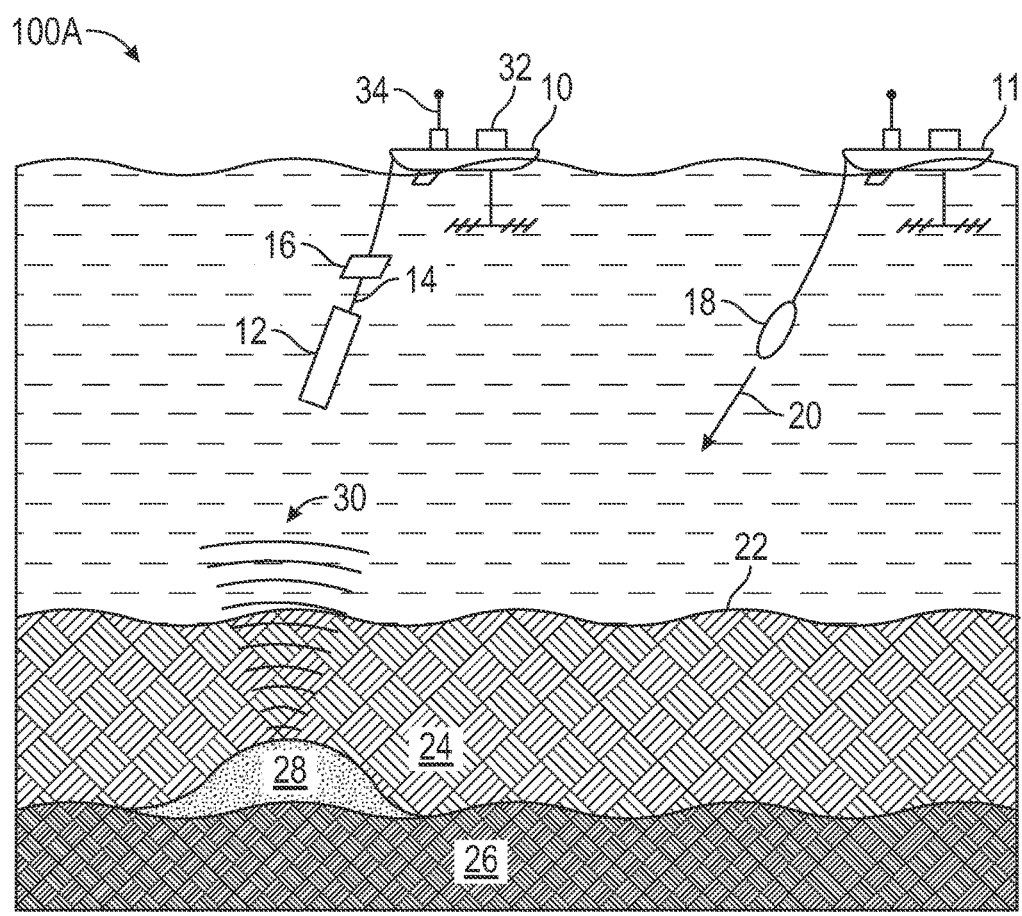
FIGS. 1A-1B illustrate diagrams of systems for acquiring seismic survey data using a multi-dimensional seismic sensor array coupled to an unmanned marine vessel in accordance with implementations of various techniques described herein.

The discussion below is directed to certain implementations. It is to be understood that the discussion below is only{XE "Narrowing designation: only" } for the purpose of enabling a person with ordinary skill in the art to make and use any subject matter defined now or later by the patent "claims" found in any issued patent herein.

It is specifically intended that the claimed combinations of features not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must{XE "Narrowing designation: must" } be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical{XE "Narrowing designation: critical" } or essential{XE "Narrowing designation: essential"} to the claimed invention unless explicitly indicated as being "critical" or "essential."

It will also be understood that, although the terms first, second, etc. may be used herein to describe various elements, these elements should not be limited by these terms. These terms are only{XE "Narrowing designation: only" } used to distinguish one element from another. For example, a first object or step could be termed a second object or step, and, similarly, a second object or step could be termed a first object or step, without departing from the scope of the invention{XE "Narrowing designation: invention" }. The first object or step, and the second object or step, are both objects or steps, respectively, but they are not to be considered a same object or step.

The following paragraphs provide various techniques for acquiring seismic survey data using a multi-dimensional seismic sensor array coupled to an unmanned marine vessel, vehicle, device, etc., which will now be described in more detail with reference to FIGS. 1-10.

Marine surveys may be performed in various marine environments. In a marine survey, unmanned marine vessels, such as autonomously operated vehicles ("AOVs") or remotely operated vehicles ("ROVs"), may be used to gather seismic data from one or more seismic sensors. These seismic sensors may be attached to vertical seismic streamers deployed from the unmanned marine vessels, which may allow for more effective removal of ghost signals and measurement of propagation speed when compared with more conventional horizontal streamers towed by larger vessels.

Figure 1B:
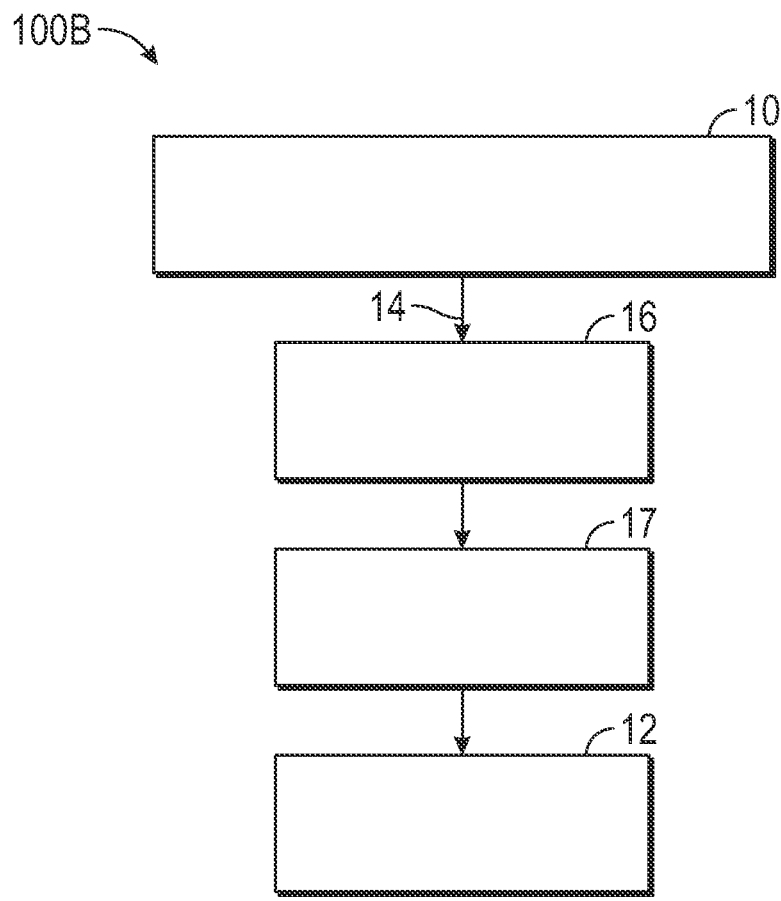

FIGS. 1A-1B illustrate various schematic diagrams of systems 100A, 100B for acquiring seismic survey data in accordance with implementations of techniques described herein. In particular, FIG. 1A illustrates a diagram of a system 100A for acquiring seismic survey data using a multi-dimensional seismic sensor array 12 coupled to an unmanned marine vessel 10, and FIG. 1B illustrates another diagram of a system 100B for coupling the multi-dimensional seismic sensor array 12 to the unmanned marine vessel 10 with a force decoupling mechanism 17, in accordance with implementations of various techniques described herein.

The system 100 may include at least one unmanned marine vessel 10 that may be adapted to descend through a water column or may be adapted for movement on a sea surface via a thrust or propulsion mechanism. The unmanned marine vessel 10 may include an autonomously operating vehicle ("AOV") or a remotely operating vehicle ("ROV") maneuvering on the sea surface, such as a wave glider or a hybrid water vehicle. In some examples, the wave glider may be configured to harness wave energy to impart motion to the wave glider. In some examples, the hybrid water vehicle may be configured to combine mechanical propulsion methods with energy harvesting principles, such as the energy harvesting principles used by wave gliders. In some examples, the unmanned marine vessel 10 may take the form of one or more other types of marine vessels, such as a diving wave glider, a submarine unmanned marine vessel, a sail buoy, an ocean bottom node, or any other implementation known to those skilled in the art.

The unmanned marine vessel 10 may be used for seismic surveying and may include a multi-dimensional seismic sensor array 12. In various implementations, the term multi-dimensional may refer to two-dimensional ("2D"), three-dimensional ("3D"), or more than three dimensional, depending on specific implementations. Further, in some implementations, the multi-dimensional seismic sensor array 12 may be referred to as a seismic sensor package having multiple seismic sensors as described herein.

In reference to FIG. 1A, the multi-dimensional seismic sensor array 12 may be disposed on a streamer 14 coupled to the unmanned marine vessel 10. The streamer 14 may descend in a generally vertical direction from the unmanned marine vessel 10 into a water column. In one implementation, the streamer 14 may descend to a depth below the sea surface. For example, the streamer 14 may descend 10 meters or greater below the sea surface.

In various implementations, the multi-dimensional seismic sensor array 12 may be coupled to a hull of the unmanned marine vessel 10 via an umbilical cord or a streamer 14. The multi-dimensional seismic sensor array 12 may be configured to acquire seismic survey data and calculate pressure gradients in multiple directions. In some examples, the multiple directions may include horizontal and vertical directions. In some other examples, the multiple directions may include any or all of x-coordinate, y-coordinate, and z-coordinate directions.

The multi-dimensional seismic sensor array 12 may include various sensor including pressure sensors, particle motion sensors, and/or multi-component seismic sensors. For example, in reference to multi-component seismic sensors, the multi-dimensional seismic sensor array 12 may be configured to detect a pressure wavefield and at least one component of a particle motion that is associated with acoustic signals that may be proximate to the multi-component seismic sensor. Further, examples of particle motion sensors include one or more components of a particle displacement, one or more components (inline (x), crossline (y) and vertical (z) components) of a particle velocity and one or more components of a particle acceleration.

In various implementations, the multi-component seismic sensors may include one or more geophones, hydrophones, inclinometers, particle displacement sensors, optical sensors, particle velocity sensors, accelerometers, pressure gradient sensors, or combinations thereof. According to some embodiments, a particular multi-component seismic sensor may include three orthogonally-aligned accelerometers (e.g., three-component micro-electro-mechanical system ("MEMS") accelerometer) to measure three corresponding orthogonal components of particle velocity and/or acceleration near the seismic sensor. According to some embodiments, the MEMS-based accelerometer may be a capacitive MEMS-based sensor of the type described in commonly assigned co-pending U.S. patent application Ser. No. 12/268,064, which is incorporated herein by reference. In some implementations, one or more hydrophones configured for measuring pressure may be used in combination with the three-component MEMS described herein.

The multi-component seismic sensor may be implemented as a single device or as a plurality of devices. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, at a particular point, seismic data indicative of the pressure data with respect to the inline direction.

The unmanned marine vessel 10 may be deployed to a survey area for seismic surveying. Where the unmanned marine vessel 10 takes the form of an AOV, the unmanned marine vessel 10 may be deployed to a survey area specified on a navigation map. The unmanned marine vessel 10 may automatically make corrections, if the unmanned marine vessel 10 veers off-course. Where the unmanned marine vessel 10 takes the form of a ROV, the unmanned marine vessel 10 may be deployed to a survey area using remote operation of the unmanned marine vessel's rudder and/or thrust mechanism.

After deploying the unmanned marine vessel 10 to the survey area, a seismic source 18 may be activated to generate acoustic waves 20 that propagate through an ocean bottom surface 22 and into strata 24, 26 beneath the ocean bottom surface. The seismic source 18 may be located on another unmanned marine vessel 11, as shown in FIG. 1A, or more conventional source deployments may be used, such as the use of dedicated source vessels. The seismic source 18 may be a conventional air gun, marine vibrator, or non-traditional environmentally friendly source. The seismic source may also include drilling induced acoustic pressure waves, passive seismic noise, or production induced acoustic pressure waves, such as those which may result from water or gas injections, or combinations thereof.

Acoustic signals 20 may be reflected from various subterranean geological formations, such as formation 28 depicted in FIG. 1A. The incident acoustic signals 20 produce corresponding reflected acoustic signals, or pressure waves 30, which are sensed by the multi-dimensional seismic sensor array 12. The unmanned marine vessel 10 may record seismic data from over one hundred seismic sensors.

The multi-dimensional seismic sensor array 12 may generate signals called "traces," which indicate the acquired measurements of the pressure wavefield and particle motion if the sensors include particle motion sensors. The traces are recorded and may be passed to a data acquisition system 32 disposed on the unmanned marine vessel 10. The data acquisition system 32 may include a digitizer, a computer system, and a storage system for storing seismic data acquired during the survey. The storage system may include memory, such as a hard disk drive. In one implementation, the seismic data may be recorded continuously over days or months at a time. In another implementation, the seismic data may be recorded intermittently, such as after each detonation of the seismic source 18.

The unmanned marine vessel 10 may include an onboard communication unit 34, which may communicate with a base station located onshore or at sea, such as on a rig or vessel. The communication unit 34 may be used to transmit data and information associated with the unmanned marine vessel 10, including position, quality control parameters, time information, and seismic data. The communication unit 34 may send or receive commands particular to the seismic survey. The unmanned marine vessel 10 may include a power source (e.g., batteries, motor, propeller, etc.) configured to drive and provide propulsion to the unmanned marine vessel 10. In some examples, the unmanned marine vessel 10 may be powered by batteries, which may be recharged by solar panels disposed on the top of the unmanned marine vessel 10.

As mentioned previously and as illustrated in FIG. 1A, the streamer 14 may descend in a generally vertical direction from the unmanned marine vessel 10 into the water column. The length of the streamer 14 may vary from less than one meter to over one kilometer. In some examples, a sub component 16 may be disposed between the umbilical cord or streamer 14 and the multi-dimensional seismic sensor array 12. The sub component 16 may be configured to provide electrical communication between the unmanned marine vessel 10 and the multi-dimensional seismic sensor array 12. In some examples, the sub component 16 may be employed as a fairing to reduce cross-flow noise due to currents and drag forces. Further, in some examples, accelerometers (not shown) capable of measuring a gravity vector may be used to measure a tilt of the streamer 14 relative to the vertical.

In reference to FIG. 1B, the system 100B may be referred to as an assembly or an ensemble of the unmanned marine vessel 10 including a wave glider float, the umbilical cord 14, the sub component 16, the force decoupling mechanism 17, and the multi-dimensional seismic sensor array 12. In some implementations, the force decoupling mechanism 17 may be used to couple the multi-dimensional seismic sensor array 12 to the unmanned marine vessel 10. As shown in FIG. 1B, the force decoupling mechanism 17 may be disposed between the sub component 16 and the multi-dimensional seismic sensor array 12.

In some implementations, the umbilical cord 14 may be thinner than conventional towed streamers and may be configured for facilitating ease of handling by the unmanned marine vessel 10. For example, the umbilical cord 14 may have a diameter of one half of one inch. Further, the umbilical cord 14 may be formed of fiber optic cables and/or cables with fiber optic sensors may be used, thus resulting in a lighter and thinner streamer relative to conventional towed streamers.

Figure 2:
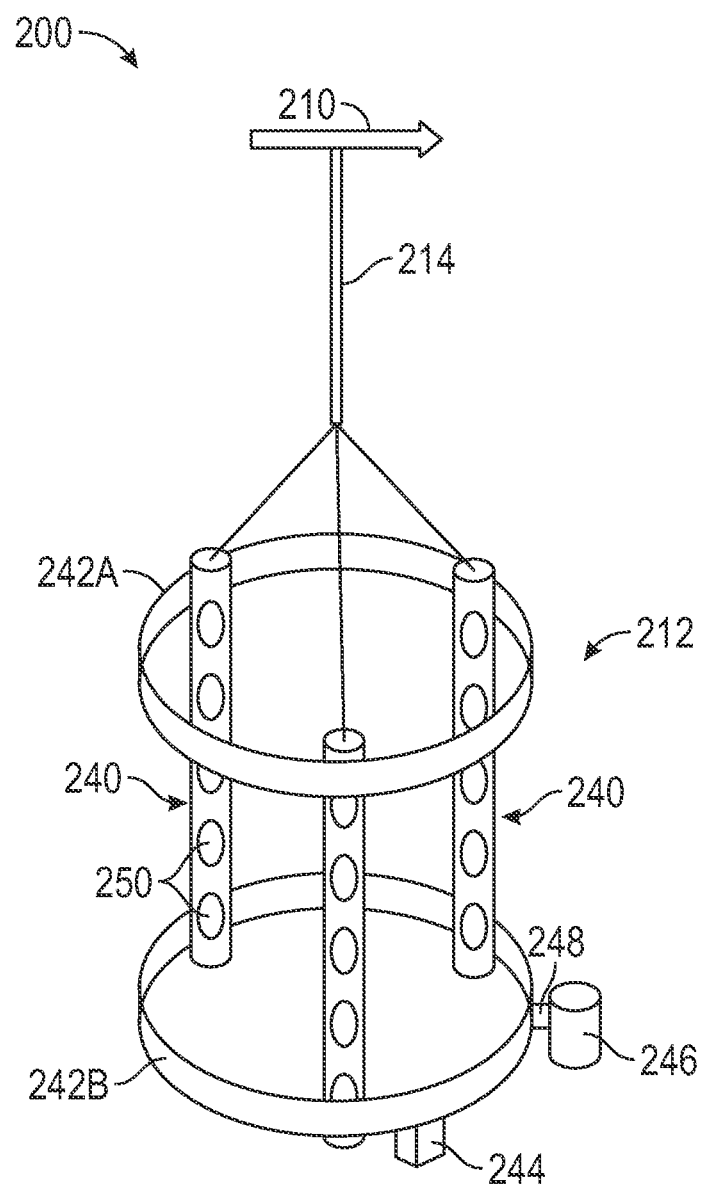
FIG. 2 illustrates a diagram of a system for acquiring seismic survey data using a multi-dimensional seismic sensor array coupled to an unmanned marine vessel in accordance with implementations of various techniques described herein.

FIG. 2 illustrates a diagram of a system 200 for acquiring seismic survey data using a multi-dimensional seismic sensor array 212 coupled to an unmanned marine vessel 210 in accordance with implementations of various techniques described herein. As described herein, the multi-dimensional seismic sensor array 212 may be coupled to a hull of the unmanned marine vessel 210 (e.g., a wave glider float) via an umbilical cord 214, and the seismic sensor array 212 may be configured to acquire seismic survey data and calculate pressure gradients in multiple directions. Further, the multi-dimensional seismic sensor array 212 may be configured to float beneath the unmanned marine vessel 210 at a pre-determined depth.

In reference to FIG. 2, the multi-dimensional seismic sensor array 212 may include multiple seismic streamers 240 (e.g., at least three seismic streamers) arranged parallel to one another in a triangular prism shape that can be positioned vertically. In some examples, the seismic streamers 240 may be coupled together with multiple collars including a first collar 242A coupled to a first end of the seismic streamers and a second collar 242B coupled to a second end of the seismic streamers that is opposite the first end. In some examples, a buoyancy of the multiple collars 242A, 242B may be configured to maintain the multi-dimensional seismic sensor array 212 at a particular depth in a water column. Further, in some examples, the multi-dimensional seismic sensor array 212 may include one or more of an underwater orientation device 244, a small engine thruster 246, and a miniature steering device 248 (e.g., a miniQ-Fin™).

The multi-dimensional seismic sensor array 212 may include a plurality of seismic sensors 250 arranged in a multi-dimensional geometric configuration. In some examples, the seismic sensors 250 deployed in the streamers 240 may include one or more of hydrophones, MEMS accelerometers, geophones, and the like. The number of seismic sensors 250 and a separation of the seismic sensors coupled to the streamers 240 may be determined as a function of signal-to-noise (SNR) requirements and the capability to perform separation of an upgoing seismic wavefield from a downgoing seismic wavefield (receiver deghosting).

In some implementations, if multiple hydrophone components refer to $u_i, v_i, z_i$, which may correspond to first, second, and third streamers, respectively, the pressure gradient may be calculated in a vertical direction. For example:

$$u_i - u_{i+1}$$

$$v_i - v_{i+1}$$

$$z_i - z_{i+1}$$

i=1, n where n=number of sensors in each cable.

Similarly, the gradients may be calculated in three horizontal directions:

$$u_i - v_i$$

$$v_i - z_i$$

$$z_i - u_i$$

i=1, n where n=number of sensors in each cable.

The pressure second order gradient can be also estimated in all three directions:

$$(u_{i-1} - 2u_i + u_{i+1})/d$$

d=distance between sensors

The estimation of the pressure second gradient can be used to perform a more accurate receiver deghosting or for seismic wavefield interpolation.

In some implementations, MEMS accelerometers may be used to measure water particle acceleration and gravity, where various gravity measurements may be used to determine sensor orientation. Further, since the pressure gradient may be derived from acceleration, a dual pressure gradient may be available to perform separation of upgoing and downgoing seismic fields.

Further, hydrophone measurements and MEMS acceleration measurements may be used to perform 2D deghosting and simultaneously 3D deghosting along with wavefield reconstruction, if the spatial separation of the arrays is adequate. The three dimensional sensor array may offer a possibility to attenuate seismic noise efficiently by applying a sequence of noise attenuation followed by 3D digital group forming. The output from a 3D dimensional seismic sensor array after digital group forming and 3D wavefield separation may include upgoing pressure at a location of the seismic sensor array determined at a time when the seismic source was actuated.

In some implementations, the multi-dimensional seismic sensor array 212 may include at least three vertical streamers 240 having a length of 1 m to 4 m and separated by 0.5 m or thereabout, e.g., substantially 0.5 m. The streamers 240 may be coupled together to form a triangular prism with use of two collars 242A, 242B (or rings). A composition of the collars may include a material having a density of less than (or substantially less than) 1 g/cm$^3$ for floating in water. The number of collars may be more than two depending on the weight of the three vertical streamers and other devices that may be added, like the underwater orientation device 244 and the one or more thrusters 246. A calculation of buoyancy may be determined in such a way that the multi-dimensional sensor array 212 maintains a desired deployment depth in water.

In some implementations, the deployment depth of the multi-dimensional seismic sensor array 212 may be below 10 meters (m) from the water surface, such as, for example, a deployment depth of 15 m to 20 m or greater. Further, attached to the multi-dimensional seismic sensor array 212 may be the underwater orientation device 244, one or more small engines or thrusters 246, and/or one or more streamer steering devices 248 (e.g., mini Q-Fins™ available commercially from the Assignee of the subject application) to assist with controlling the verticality of the multi-dimensional seismic sensor array 212 and to hold the multi-dimensional seismic sensor array 212 at the desired station, if the unmanned marine vessel 210 is configured to hold station. The thrusters 246 may assist with moving the multi-dimensional seismic sensor array 212 to a new station. An alternative to using the thruster 246 may include using the steering devices 248, wherein the steering devices 248 may be used to steer the streamers 240 in towed-streamer marine data acquisition.

Figure 3:
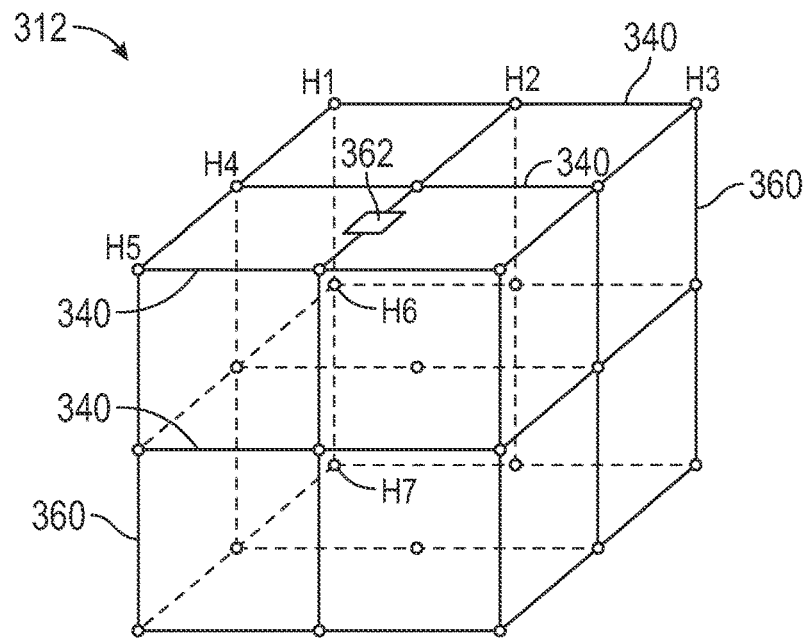
FIGS. 3-4 illustrate various diagrams of devices for acquiring seismic survey data using a multi-dimensional seismic sensor array coupled to an unmanned marine vessel in accordance with implementations of various techniques described herein.

FIG. 3 illustrates a diagram of a device 300 for acquiring seismic survey data using a multi-dimensional seismic sensor array 312 coupled to an unmanned marine vessel (e.g., the unmanned marine vessel 10 of FIG. 1A) in accordance with implementations of various techniques described herein. The multi-dimensional seismic sensor array 312 may be coupled with a hull of the unmanned marine vessel (e.g., a wave glider float) via an umbilical cord, and the seismic sensor array 312 may be configured to acquire seismic survey data and calculate pressure gradients in multiple directions. Further, the multi-dimensional seismic sensor array 312 may be configured to float beneath an unmanned marine vessel at a pre-determined deployment depth in a water column.

In one implementation, the multi-dimensional seismic sensor array 312 may include multiple seismic streamers 340 (e.g., at least nine seismic streamers) arranged in a multi-dimensional geometric structure, e.g., a cuboid type lattice structure having three planar levels of three seismic streamers spaced apart at similar spatial intervals. In this embodiment, 3 seismic streamers×3 rows of seismic streamers=9 seismic streamers. In some implementations, the multi-dimensional seismic sensor array 312 may include a frame 360 with multiple seismic streamers 340 (e.g., at least nine seismic streamers) arranged in a multi-dimensional geometric structure (e.g., a cuboid) at pre-determined spatial intervals. As shown, the seismic streamers 340 may be spaced apart at pre-determined spatial intervals, which may be similar, different, or random spatial intervals. It should be understood that the streamers can deviate from a straight configuration, and can have certain curved characteristics or portions. According to embodiments, fewer than nine seismic streamers can be connected to form a cube or rectangular shaped array. Four seismic streamers can be connected to form a cube or rectangular shaped array.

In some implementations, the multi-dimensional seismic sensor array 312 may be arranged in a multi-dimensional geometric structure, which may define a cuboid type lattice structure having four open side faces and two open end faces. The cuboid type lattice structure may include at least one seismic streamer coupled at each lateral edge where the four open side faces intersect, thus forming the four seismic streamers. The cuboid type lattice structure may further include at least one seismic streamer positioned between each lateral edge of the four open side faces, thus forming an additional four seismic streamers. The cuboid type lattice structure may further include at least one seismic streamer positioned within the cuboid type lattice structure, such as in a central region of the cuboid structure, thus forming one additional seismic streamers. In that embodiment, 4 seismic streamers+4 seismic streamers+1 seismic streamer=9 seismic streamers.

In some implementations, the multi-dimensional seismic sensor array 312 may include three seismic streamers arranged in parallel to one another defining a first plane and two seismic streamers arranged in parallel to at least one of the first three seismic streamers and defining a second plane that is substantially perpendicular to the first plane.

In some implementations, the multi-dimensional seismic sensor array 312 may include a plurality of hydrophones H1, H2, . . . , H7 arranged in x-coordinate, y-coordinate, and z-coordinate directions, as shown in FIG. 3. Each seismic streamer may include at least three hydrophones. As such, the multi-dimensional seismic sensor array 312 may include a 3D hydrophone array that can be attached to an unmanned marine vessel (e.g., a wave glider).

In some implementations, the multi-dimensional seismic sensor array 312 may include the 3D hydrophone array that may include 9 short streamers. The dimension of seismic sensor array 312 may be (or substantially be) 1.2 m×1.2 m×1.2 m. These dimensions can be smaller however and still function properly. The multi-dimensional seismic sensor array 312 may include a horizontal streamer separation of (or substantially) 0.6 m and a vertical separation of (or substantially) 0.6 m. The multi-dimensional seismic sensor array 312 may include three hydrophones per streamer and an interval between the hydrophones may be (or substantially be) 0.6 m. According to these various embodiments, the multi-dimensional seismic sensor array 312 may allow for calculating the first and second derivatives of pressure in any or all of x, y, and z directions and detecting the direction of the seismic arrival.

Using various implementations described herein, the pressure gradient and the second derivative of pressure in any or all of x, y, and z directions may be calculated. Various implementations described herein may further allow for performing 3D deghosting and also interpolation of the pressure in x and y directions. Further, the multi-dimensional seismic sensor array 312 may allow for detecting direction of the seismic arrival.

As described herein, a streamer in the multi-dimensional seismic sensor array 312 may be equipped with hydrophones and MEMS accelerometers. From accelerometer measurements, the pressure gradient may be estimated in any or all of x, y, and z directions, and based on these gradient measurements and pressure measurements (hydrophone data), 3D receiver deghosting and interpolation may be performed. Pressure gradient sensors can also be used.

In some implementations, the multi-dimensional seismic sensor array 312 may include a transponder 362. Further, the multi-dimensional seismic sensor array 312 may be equipped with the transponder 362 to allow for accurate positioning. As such, the transponder 362 may be used with a positioning system, such as an Ultra Short BaseLine ("USBL") positioning system. The USBL may be referred to as a Super Short Baseline ("SSBL"), and generally, the USBL may be used as an underwater positioning system along with a vessel mounted transceiver to detect range and bearing of a target using acoustic signals.

Figure 4:
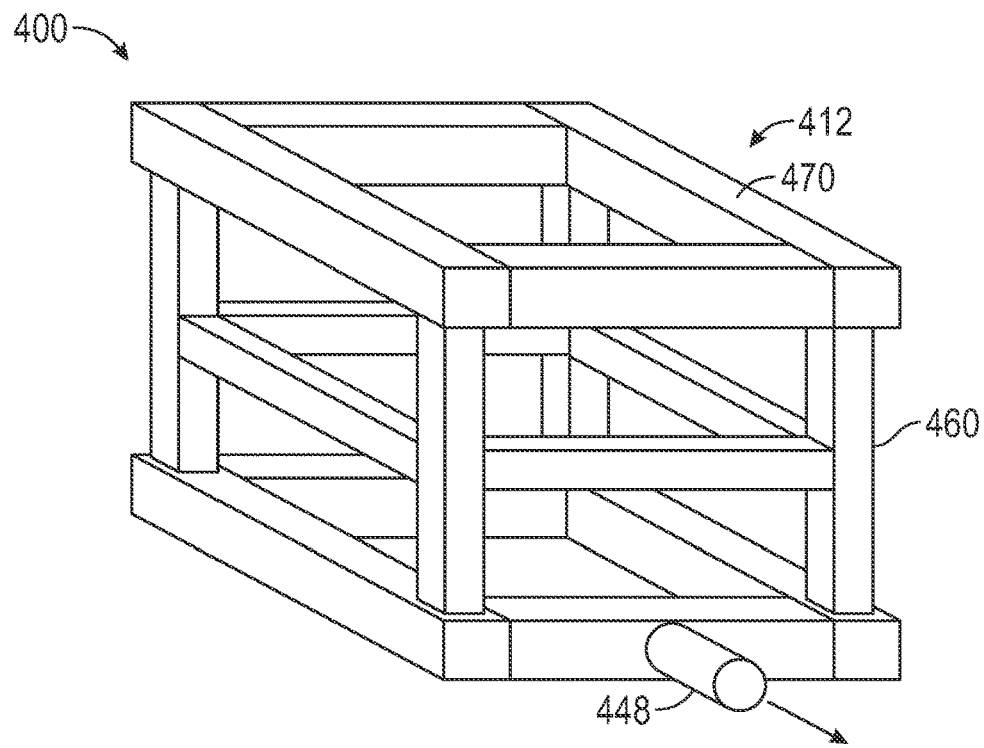

FIG. 4 illustrates a diagram of a device 400 for acquiring seismic survey data using a multi-dimensional seismic sensor array 412 coupled to an unmanned marine vessel (e.g., the unmanned marine vessel 10 of FIG. 1A) in accordance with implementations of various techniques described herein. As described herein, the multi-dimensional seismic sensor array 412 may be coupled to a hull of the unmanned marine vessel (e.g., a wave glider float) via an umbilical cord, and the seismic sensor array 412 may be configured to acquire seismic survey data and calculate pressure gradients in multiple directions. Further, the multi-dimensional seismic sensor array 412 may be configured for floating beneath an unmanned marine vessel at a pre-determined deployment depth in a water column.

In reference to FIG. 4, the multi-dimensional seismic sensor array 412 may include a plurality of shallow water nodes 470 and a frame 460 having members that are arranged to define a multi-dimensional geometric structure, such as, a multi-dimensional cuboid type lattice structure. The frame 460 may be configured to couple the shallow water nodes 470 together in the multi-dimensional geometric structure, shape, or form. The multi-dimensional seismic sensor array 412 may include a steering device 448, or thrusters as described above with reference to FIGS. 2-3.

The multi-dimensional seismic sensor array 412 may include eight shallow water nodes 470. As shown in FIG. 4, a first grouping of four shallow water nodes 470 may be coupled together and positioned at a first end of the multi-dimensional seismic sensor array 412, and a second grouping of four shallow water nodes 470 may be coupled together and positioned at a second end of the multi-dimensional seismic sensor array 412. The first end is opposite the second end.

The multi-dimensional geometric structure 412 may be configured to define an expanded cuboid type lattice structure with three planar levels of members spaced apart at similar pre-determined spatial intervals. As shown, the first grouping of four shallow water nodes 470 may be coupled together to define a rectangular shape, and similarly, the second grouping of four shallow water nodes 470 may be coupled together to define another rectangular shape.

Further, in some implementations, the multi-dimensional geometric structure may be described as a cuboid type lattice structure having four open side faces and two open end faces, including a first open end face and a second open end face. The cuboid type lattice structure may include four shallow water nodes coupled in a rectangular shape at each lateral edge of the first open end face. The cuboid type lattice structure may further include another four shallow water nodes coupled in a rectangular shape at each lateral edge of the second open end face.

As described in reference to FIG. 4, the multi-dimensional seismic sensor array 412 may be constructed and/or manufactured using shallow water nodes 470. In some implementations, each shallow water node 470 may include a hydrophone, three component geophones, and a recording system configured to record continuously for a certain period of time (e.g., 1 month). In some implementations, each of the shallow water nodes 470 may include one or more geophones arranged in a vertical orientation and configured to calculate a second derivative of pressure. Further, a compass device and an inclinometer or MEMS accelerometer may be included with the node and used to determine orientation of the node in a water column. Further, the frame 460 may be constructed and/or manufactured to hold together eight shallow water nodes, as shown in FIG. 4. Further, in some examples, the multi-dimensional sensor array 412 may be coupled or attached to an unmanned marine vessel using a vertical decoupling mechanism (e.g., the vertical force decoupling mechanism 17 of FIG. 1B).

In some embodiments, the dimensions of each node may be (or substantially be): length=521 mm, width=208 mm, and height=108 mm. In some embodiments, the dimensions of the multi-dimensional seismic sensor array 412 may be (or substantially be): 521 mm×521 mm×521 mm.

In operation, the multi-dimensional seismic sensor array 412 may include eight shallow water nodes that may allow for calculating pressure gradients in vertical and horizontal directions. Also, having vertical geophones inside each shallow water node may allow for calculating the second derivative of the pressure.

FIGS. 5A-5B illustrate diagrams depicting an unmanned marine vehicle (in this example a wave-glider), which may be used in accordance with various implementations of the present disclosure. The wave-glider 502 shown in FIG. 5A may include a streamer equipped with one or more seismic sensors. The wave glider 504 shown in FIG. 5B may include an acoustic sensor package that may be attached to the wave-glider. Accordingly, these unmanned marine vehicles may be used to effectuate a towed-streamer marine survey. In this way, the vehicles may be configured to acquire long and ultra-long offset marine seismic data, as well as the low frequencies required for full waveform inversion ("FWI") calculations.

Figure 6:
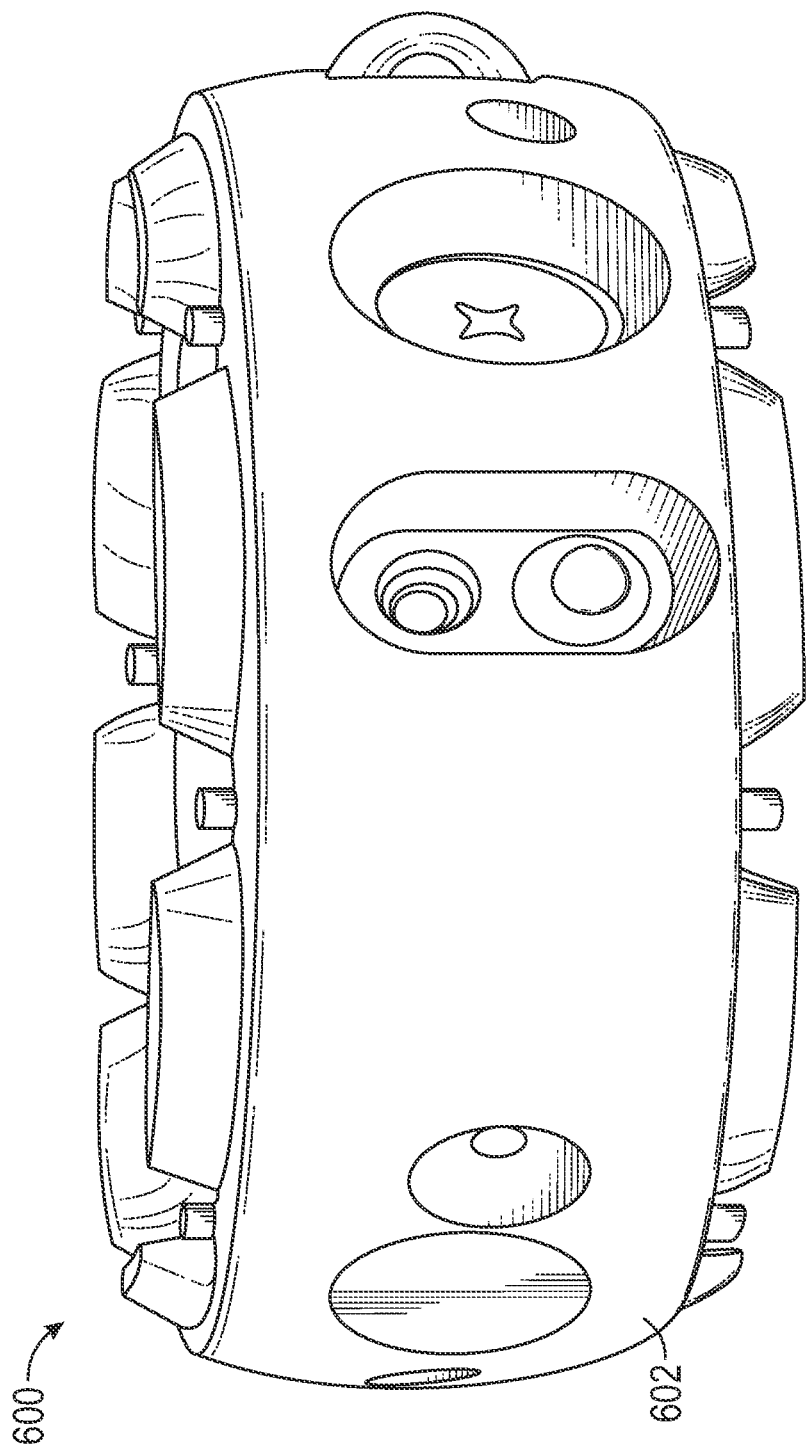
FIG. 6 illustrates an example of an Ocean Bottom Node ("OBN") in accordance with implementations of various techniques described herein.

In some embodiments, the unmanned marine vehicle may be equipped with various components and communication functionality. Some of these components may include, but are not limited to, acoustic sensors, a GPS positioning system and a recording system, that may continuously record seismic data during any marine seismic acquisition. The unmanned marine vehicle could be a wave-glider as shown in FIGS. 5A-5B, or an ocean bottom node (OBN) deployed on the ocean floor by a remotely operated underwater vehicle ("ROV") as is shown in FIG. 6. For the wave-gliders, the acoustic sensors may be deployed in a streamer or in a sensor package, and these may be connected to the recording system (FIGS. 1A and 1B). It should be noted that the particular examples of unmanned marine vehicles depicted in FIGS. 1A-1B, 5A-5B and 6 are provided merely by way of example, as any suitable unmanned marine vehicle or device may be employed without departing from the scope of the present disclosure.

In some embodiments, the multi-dimensional seismic sensor array may include sensors selected from a group consisting of one or more hydrophones, one or more micro-electro-mechanical sensor (MEMS) accelerometers, one or more geophones and one or more inclinometers. The system may further include a float associated with the unmanned marine vessel including a global positioning system ("GPS") receiver and a recording system configured to store and transmit the seismic survey data. The multi-dimensional seismic sensor array may be coupled with at least one of a sensor package or a streamer associated with the unmanned marine vessel.

In some embodiments, transmitting the seismic survey data may include storing and transmitting full waveform inversion ("FWI") data. The method may include processing the seismic survey data to perform a receiver deghosting operation. Performing a marine seismic survey may include performing the marine seismic survey using a plurality of unmanned marine vessels.

Figure 7:
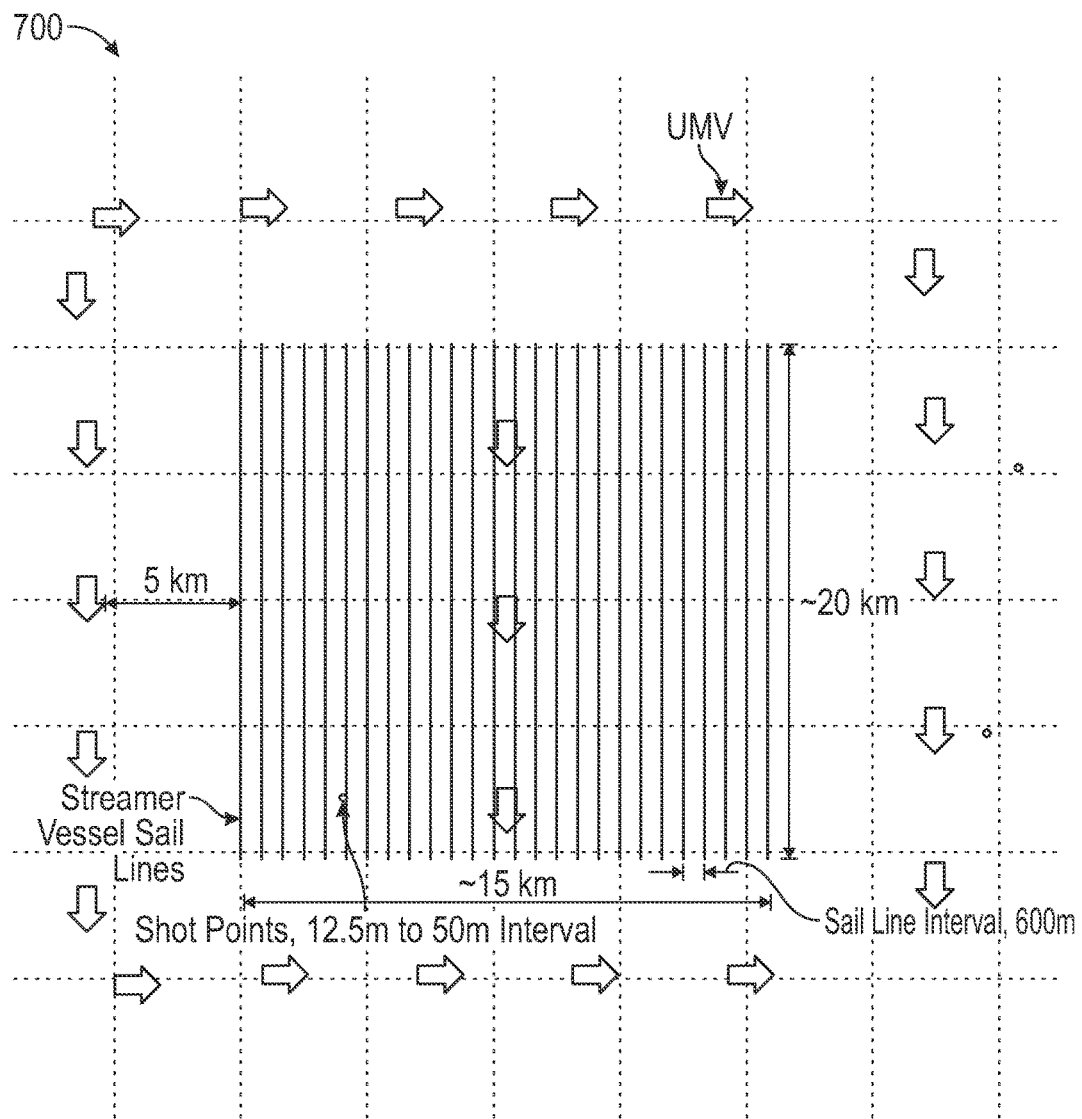
FIG. 7 illustrates an example of UMV deployment during a narrow-azimuth ("NAZ") streamer acquisition in accordance with implementations of various techniques described herein.
Figure 8:
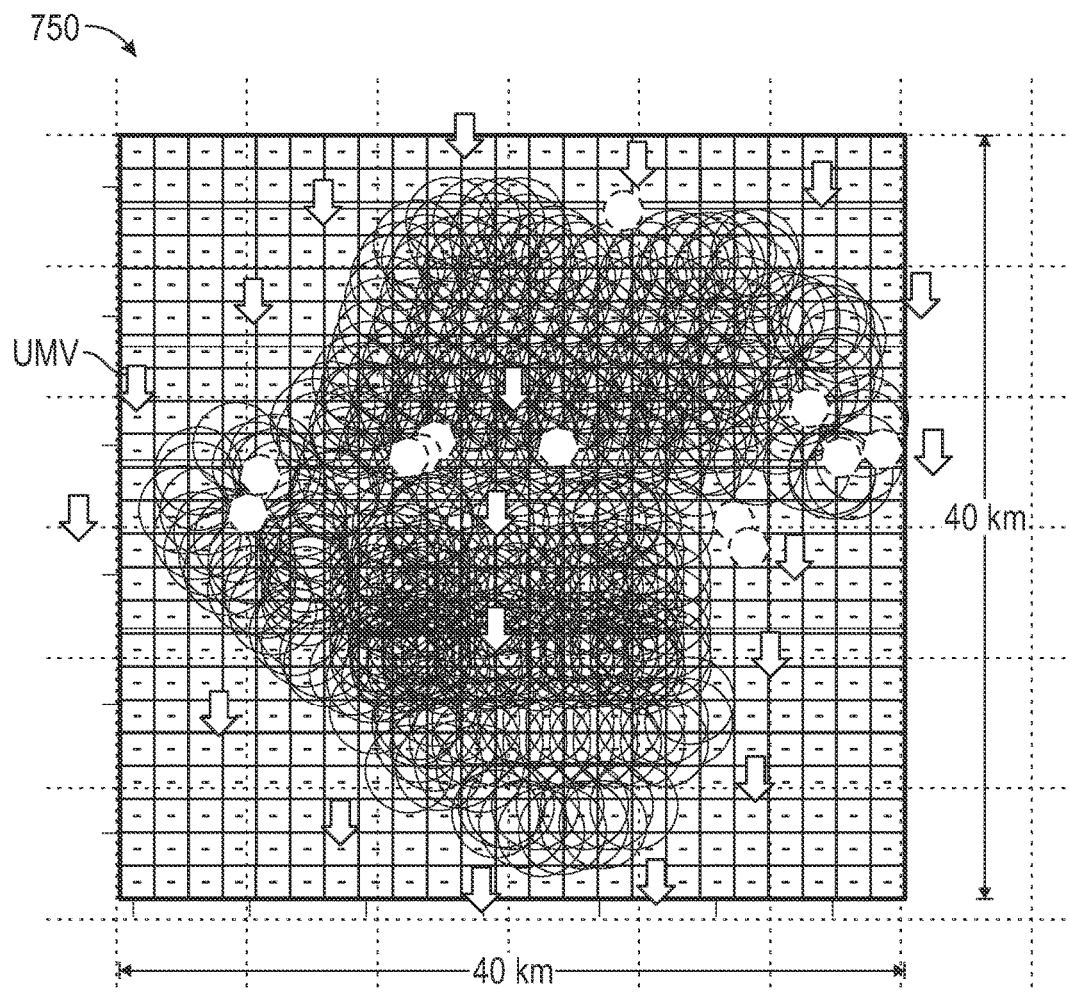
FIG. 8 illustrates an example of UMV deployment during a coil streamer type acquisition in accordance with implementations of various techniques described herein.

Referring now to FIGS. 7 and 8, examples of UMV deployment during a narrow-azimuth ("NAZ") streamer acquisition and dual coil streamer acquisition are provided. The UMVs described in various embodiments herein may be stationary or dynamically movable in nature. In some implementations, if wave-gliders are deployed these may float at the sea surface and if OBN are deployed these may be laid on the ocean floor. To determine the locations of the UMV and the number of UMV a survey design and modeling study may be performed that may a number of suitable operations as are discussed in further detail herein below.

In some implementations, the survey design and modeling study may include the generation of a 3D velocity model and a density model using all available information (e.g., existent seismic data, vertical seismic profile ("VSP") log data, etc.). The study may also include obtaining information about the target horizons in the area (e.g., shallow and deep horizons) and generating positioning information for the proposed towed streamer marine acquisition. The study may also include performing a 3D ray tracing study to optimally position the UMV with respect to the location of the shots from the towed streamer survey, deriving the illumination of the target horizons for different offset ranges, assess and optimize the locations of the UMV and the number of UMV (e.g., based on 3D ray tracing results). In some implementations, this may require repeating some or all of the above until good locations of the UMV are obtained. It should be noted that when using ray tracing it may be include considering reflected, refracted, and the diving waves. The study may also include generating 3D finite difference modeling using the optimum location of the UMV derived from ray tracing. In some implementations, reciprocity may be used in modeling to reduce the computational time for 3D finite difference modeling (e.g., common receiver gathers). The study may also include perturbing the existent velocity model and performing FWI on common receiver gathers data. This may also include determining if the long and ultra-long offset provides the information required to derive an accurate velocity model. Perturbing the existent velocity model and performing FWI may be repeated with different percentages of velocity perturbations. Based on the results of FWI it may be decided if the locations of the UMV with respect to the location of the shots from the towed streamer survey are optimum for FWI. In some implementations, if the wave-glider locations are not optimum some of the above operations may be repeated.

Referring again to FIG. 7, an example of UMV deployment to acquire long and ultra-long offset data during a narrow-azimuth streamer type acquisition is provided. In this particular example, the shot interval along the sail lines may be between 12.5 m and 50 m and the sail line interval may be between 250 m to 600 m.

Referring again to FIG. 8, an example of UMV deployment to acquire long and ultra-long offset data during a coil streamer type acquisition is provided. The shot points from coil acquisition may be marked by the light circles and the wave-gliders are shown by the arrows; the dashed circles represent platforms in the survey area. It should be noted that the NAZ and coil streamer type acquisitions are provided merely by way of example, as any suitable acquisition may be used in conjunction with the embodiments described herein.

In some embodiments, various types of deployment for the UMV may be utilized including, but not limited to, stationary and moving types. For example, in the stationary approach the UMV may stay at the same locations for the entire marine survey. In the moving approach, the UMV may follow the streamer lines to maintain the same maximum and minimum offset vs. the streamer shot lines. A hybrid combination of stationary and moving UMV may also be within the scope of the present disclosure, depending of the maximum and minimum offset requirements for FWI.

Referring again to FIG. 6, in some implementations an Ocean Bottom Node 600 for acquiring seismic streamer data may be employed. The Ocean bottom node may include a housing 602 and a multi-dimensional seismic sensor array coupled with the Ocean Bottom Node 600. The multi-dimensional seismic sensor array may be configured to acquire one or more of long and ultra-long seismic survey data. The multi-dimensional sensor array may include at least one of a pressure sensor, a vertical geophone, a horizontal geophone, a recording system, and one or more accelerometers configured to measure the acceleration of particle velocity in a plurality of directions.

In some implementations, for the OBN 600 the acoustic sensors may include a pressure sensor (e.g., hydrophone) and vertical and horizontal geophones. OBN 600 may also include a recording system and a clock that measures accurately measures the time. The accelerometers may be configured to measure the acceleration of the particle velocity in Z, Y and X directions, which allows deriving the pressure gradients. Combination of pressure measurements and pressure gradients in Z direction for wave-gliders, or the combination of pressure measurements with vertical geophone measurements for OBN, may be used to perform attenuation of the receiver ghosts during seismic data processing. This process, called receiver deghosting, enhances the very low frequencies used by FWI in the inversion process and this allows starting the inversion process with less accurate initial velocity models.

Although much of the discussion included herein discusses FWI data it should be noted that the subject application is not limited to this data. Accordingly, the unmanned marine vehicles described herein may be configured to obtain, store and/or transmit any suitable type of data. In some embodiments, long and ultra-long offset data may be used for velocity model building using the state of the art techniques, some of which may include, but are not limited to, FWI data, diving wave tomography data, Kirchhoff type tomography data, wave equation tomography data, and Reverse Time Migration angle gathers, etc.

Embodiments disclosed herein may allow for reciprocity to be used in data processing and imaging, which may reduce the volume of data and the cost of the processing and imaging. Accordingly, a common receiver gathers ("CRG") may be generated for each UMV (e.g., wave glider) with each CRG containing all the shots, or seismic traces, recorded by the wave glider during the streamer survey, at a given stationary location. The reduced volume of data for velocity model building may allow for efficient generation of the initial velocity/anisotropy models that may be used during the full processing of the towed streamer data as starting velocity/anisotropy models. In some embodiments, the wave glider may include at least one seismic sensor that may be configured to record the subsurface seismic response generated by all seismic sources fired during a marine towed streamer seismic survey.

It should also be noted that the teachings of the present disclosure may be used in accordance with any marine seismic survey. Some of these may include, but are not limited to, a narrow-azimuth streamer acquisition, a wide-azimuth streamer acquisition, a full-azimuth streamer acquisition, and a dual coil streamer acquisition, etc.

In some implementations, the unmanned marine vessel may be a wave glider that may collect in each sensor of the multi-dimensional array the seismic response generated by the shots fired during a towed streamer seismic survey. This collection of traces is so called Common Receiver Gather.

In another implementation, a method for acquiring seismic streamer data is provided. The method may include performing a marine seismic survey using an unmanned marine vessel having a power source configured to drive and provide propulsion to the unmanned marine vessel. The method may further include acquiring one or more of long and ultra-long offset seismic survey data using a multi-dimensional seismic sensor array coupled with the unmanned marine vessel. The method may also include providing the seismic survey data as a reduced data set for generation of an initial earth model that will be used in velocity model building process.

In some implementations, the unmanned marine vessel may be at least one of a wave-glider and an ocean bottom node, the unmanned marine vessel may include one common receiver gather configured to contain all of the seismic traces recorded during the seismic streamer survey. The multi-dimensional seismic sensor array may include sensors selected from a group consisting of one or more hydrophones, one or more micro-electro-mechanical sensor ("MEMS") accelerometers, one or more geophones, one or more pressure gradient sensors, and one or more inclinometers. The unmanned marine vessel may include a float having a global positioning system ("GPS") receiver and a recording system configured to store and transmit the seismic survey data. The multi-dimensional seismic sensor array may be coupled with at least one of a sensor package or a streamer associated with the unmanned marine vessel. In some implementations, the unmanned marine vehicle can be configured to acquire data during any type of towed streamer survey like a narrow-azimuth streamer acquisition or a dual coil streamer full azimuth acquisition. Transmitting the seismic survey data may include storing and transmitting data that can be fully processed to create a subsurface image or to be used in full waveform inversion ("FWI") for velocity model building. Processing of wave glider data can be done similarly with towed streamer data or OBN data and the processing may include receiver deghosting and source deghosting. Performing a marine seismic survey with wave gliders may include a plurality of wave gliders. The number of wave gliders may be a function of the survey size and other geophysical requirements like offset and azimuth distribution, signal-to-noise ratio, seismic resolution.

Figure 9:
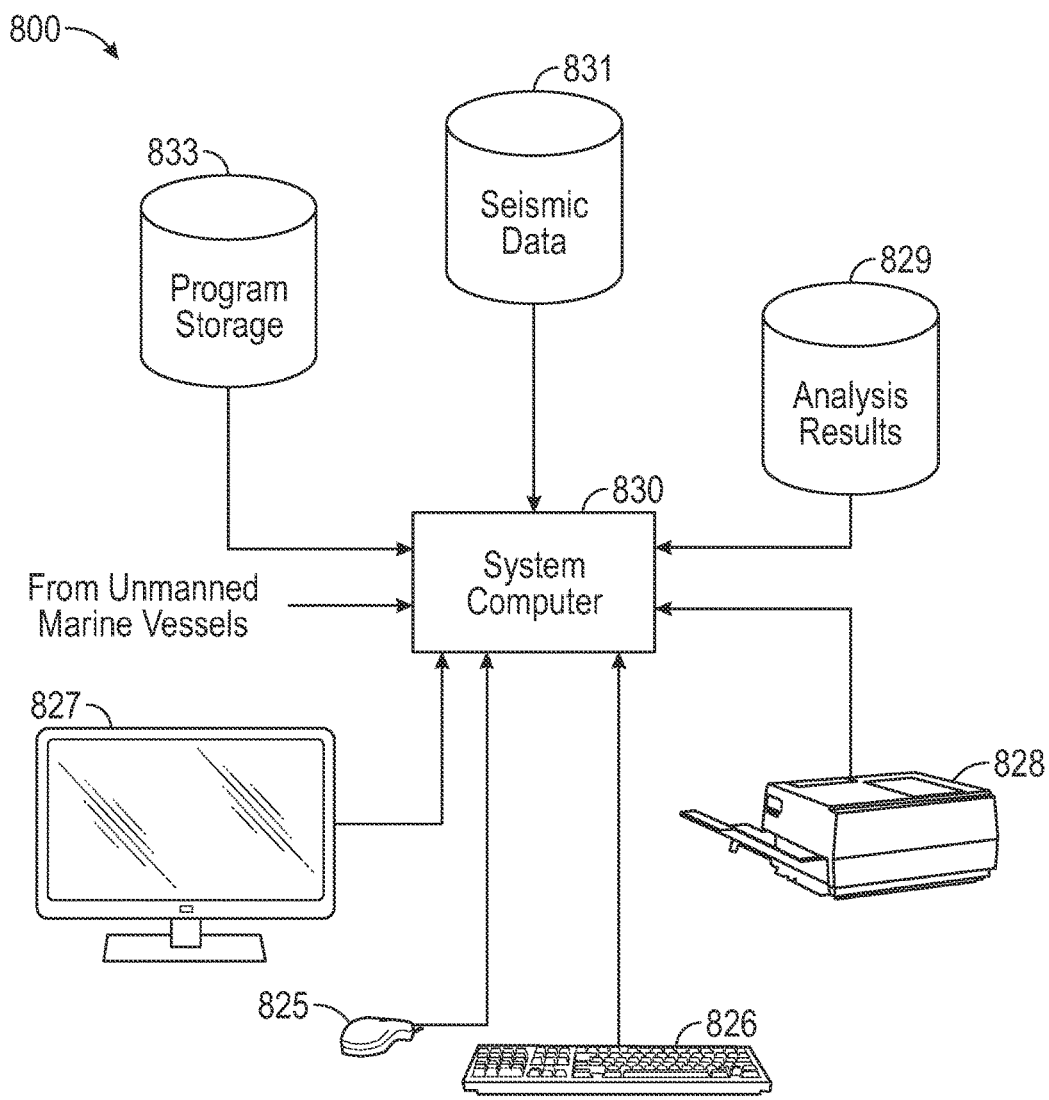
FIG. 9 illustrates a computing system in accordance with implementations of various techniques described herein.

FIG. 9 illustrates a computing system 800 that may be used in connection with various implementations described herein that may be implemented. The computing system 800 (system computer) may include one or more system computers 830, which may be implemented as any conventional computer or server. However, those skilled in the art will appreciate that implementations of various techniques described herein may be practiced in other computer system configurations, including hypertext transfer protocol (HTTP) servers, hand-held devices, multiprocessor systems, microprocessor-based or programmable consumer electronics, network PCs, minicomputers, mainframe computers, and the like.

The system computer 830 may be in communication with disk storage devices 829, 831, and 833, which may be external hard disk storage devices. It is contemplated that disk storage devices 829, 831, and 833 are conventional hard disk drives, and as such, will be implemented by way of a local area network or by remote access. Of course, while disk storage devices 829, 831, and 833 are illustrated as separate devices, a single disk storage device may be used to store any and all{XE "Narrowing designation: all" } of the program instructions, measurement data, and results as desired.

In some implementations, seismic data from the sensors may be stored in disk storage device 831. The system computer 830 may retrieve the appropriate data from the disk storage device 831 to process seismic data according to program instructions that correspond to implementations of various techniques described herein. The program instructions may be written in a computer programming language, such as $C^{++}$, Java and the like. The program instructions may be stored in a computer-readable medium, such as program disk storage device 833. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only{XE "Narrowing designation: only" } memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 830. Communication media may embody computer readable instructions, data structures or other program modules. By way of example, and not limitation, communication media may include wired media such as a wired network or direct-wired connection, and wireless media such as acoustic, radio frequency (RF), infrared (IR), and various other wireless media. Further, combinations of any of the above may also be included within the scope of computer readable media.

In some implementations, the system computer 830 may provide output primarily onto graphics display 827, or via printer 828. The system computer 830 may store the results of the methods described above on disk storage 829, for later use and further analysis. Further, the keyboard 826 and/or the pointing device 825 (e.g., a mouse, trackball, or the like) may be provided with the system computer 830 to enable interactive operation.

The system computer 830 may be located at a data center remote from the survey region. The system computer 830 may be in communication with the receivers (either directly or via a recording unit, not shown), to receive signals indicative of the reflected seismic energy. These signals, after conventional formatting and other initial processing, may be stored by the system computer 830 as digital data in the disk storage 831 for subsequent retrieval and processing in the manner described above. In one implementation, these signals and data may be sent to the system computer 830 directly from sensors, such as geophones, hydrophones, and the like. When receiving data directly from the sensors, the system computer 830 may be described as part of an in-field data processing system. In another implementation, the system computer 830 may process seismic data already stored in the disk storage 831. When processing data stored in the disk storage 831, the system computer 830 may be described as part of a remote data processing center, separate from data acquisition. The system computer 830 may be configured to process data as part of the in-field data processing system, the remote data processing system or a combination thereof.

While FIG. 9 illustrates the disk storage 831 as directly connected to the system computer 830, it is also contemplated that the disk storage device 831 may be accessible through a local area network or by remote access. Further, while disk storage devices 829, 831 are illustrated as separate devices for storing input seismic data and analysis results, the disk storage devices 829, 831 may be implemented within a single disk drive (either together with or separately from program disk storage device 833), or in any other conventional manner as will be fully understood by one of skill in the art having reference to this specification.

Figure 10:
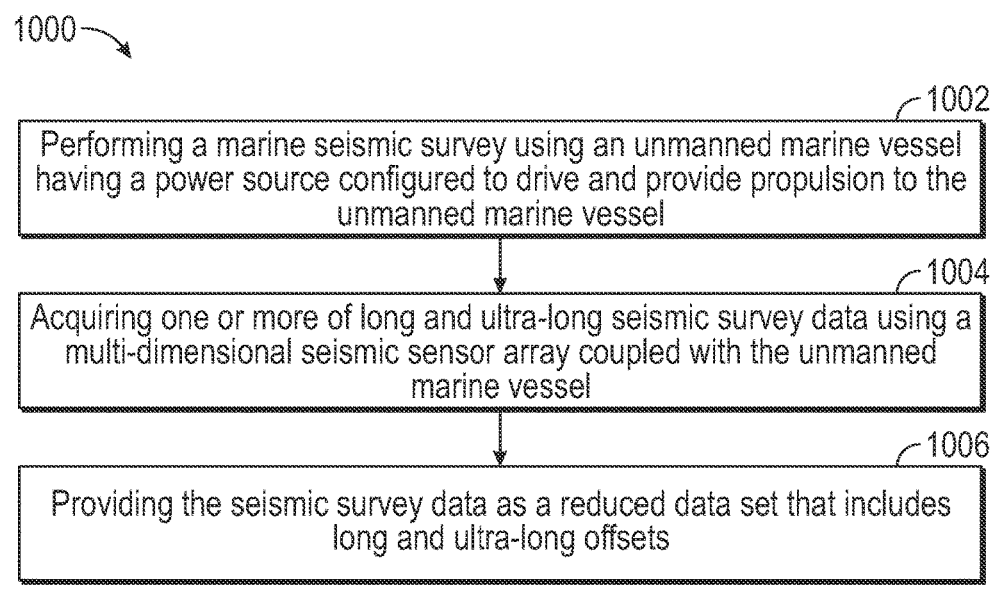
FIG. 10 is a flow diagram of a process in accordance with implementations of various techniques described herein.

Referring also to FIG. 10, a flowchart 1000 depicting operations consistent with an embodiment of the seismic streamer data acquisition process described herein is provided. Embodiments may include performing (1002) a marine seismic survey using an unmanned marine vessel having a power source configured to drive and provide propulsion to the unmanned marine vessel. Embodiments may further include acquiring (1004) one or more of long and ultra-long seismic survey data using a multi-dimensional seismic sensor array coupled with the unmanned marine vessel. Embodiments may also include providing (1006) the seismic survey data as a reduced data set that includes long and ultra-long offsets.

The flowchart and block diagrams in the figures illustrate the architecture, functionality, and operation of possible implementations of systems and methods and according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As used in any embodiment described herein, the term "circuitry" may comprise, for example, singly or in any combination, hardwired circuitry, programmable circuitry, state machine circuitry, and/or firmware that stores instructions executed by programmable circuitry. It should be understood at the outset that any of the operations and/or operative components described in any embodiment or embodiment herein may be implemented in software, firmware, hardwired circuitry and/or any combination thereof.

The terminology used herein is for the purpose of describing particular embodiments and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the Seismic Streamer Data Acquisition System described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Having thus described the disclosure of the present application in detail and by reference to embodiments thereof, it will be apparent that modifications and variations are possible without departing from the scope of the disclosure defined in the appended claims.

What is claimed is:

1. A system for acquiring seismic streamer data during a seismic streamer survey, comprising:
    an unmanned marine vessel having a power source configured to drive and provide propulsion to the unmanned marine vessel;
    a multi-dimensional seismic sensor array coupled with the unmanned marine vessel, wherein the multi-dimensional seismic sensor array is configured to acquire ultra-long seismic survey data, wherein ultra-long seismic survey data includes data having an offset greater than 20 km; and
    a float associated with the unmanned marine vessel including a global positioning system ("GPS") receiver and a recording system configured to store and transmit the seismic survey data for a full waveform inversion ("FWI").

2. The system of claim 1, wherein the unmanned marine vessel is a wave-glider.

3. The system of claim 1, wherein the multi-dimensional seismic sensor array comprises sensors selected from a group consisting of one or more hydrophones, one or more micro-electro-mechanical sensor (MEMS) accelerometers, one or more geophones, one or more pressure gradient sensors, and one or more inclinometers.

4. The system of claim 1, wherein the multi-dimensional seismic sensor array is coupled with at least one of a sensor package or a streamer associated with the unmanned marine vessel.

5. The system of claim 1, wherein the unmanned marine vessel is configured to perform at least one of a narrow-azimuth streamer acquisition, a wide-azimuth streamer acquisition, a full-azimuth streamer acquisition, and a full-azimuth dual coil streamer acquisition.

6. The system of claim 1, wherein the unmanned marine vessel is configured to perform at least one of a stationary, dynamic, or hybrid deployment.

7. The system of claim 1, wherein the unmanned marine vessel is an ocean bottom node.

8. The system of claim 7, wherein the ocean bottom node includes at least one of a pressure sensor, vertical geophone, horizontal geophone, recording system and one or more accelerometers.

9. The system of claim 8, wherein the ocean bottom node includes one or more accelerometers configured to measure the acceleration in a plurality of directions.

10. A method for acquiring seismic streamer data during a seismic streamer survey, comprising:
    performing a marine seismic survey using an unmanned marine vessel having a power source configured to drive and provide propulsion to the unmanned marine vessel;
    acquiring ultra-long offsets seismic survey data using a multi-dimensional seismic sensor array coupled with the unmanned marine vessel, wherein ultra-long seismic survey data includes data having an offset greater than 20 km; and
    providing the seismic survey data for a full waveform inversion ("FWI") as a reduced data set that includes ultra long offsets.

11. The method of claim 10, wherein the unmanned marine vessel is at least one of a wave-glider and an ocean bottom node.

12. The method of claim 10, wherein the multi-dimensional seismic sensor array comprises sensors selected from a group consisting of one or more hydrophones, one or more micro-electro-mechanical sensor (MEMS) accelerometers, one or more geophones, one or more pressure gradient sensors, and one or more inclinometers.

13. The method of claim 10, wherein the unmanned marine vessel includes a float having a global positioning system ("GPS") receiver and a recording system configured to store and transmit the seismic survey data.

14. The method of claim 10, wherein the multi-dimensional seismic sensor array is coupled with at least one of a sensor package or a streamer associated with the unmanned marine vessel.

15. The method of claim 10, wherein performing a marine seismic survey includes performing at least one of a narrow-azimuth streamer acquisition, a wide-azimuth streamer acquisition, a full-azimuth streamer acquisition, and a full-azimuth dual coil streamer acquisition.

16. The method of claim 13, wherein transmitting the seismic survey data includes storing and transmitting seismic data for at least one of diving wave tomography, Kirchhoff type tomography, wave equation tomography, and Reverse Time Migration angle gathers.

17. The method of claim 16, further comprising: processing the seismic survey data to perform a receiver deghosting operation using a pressure first order gradients.

18. The method of claim 10, wherein performing a marine seismic survey includes performing the marine seismic survey using a plurality of unmanned marine vessels.

19. An Ocean Bottom Node for acquiring seismic streamer data comprising:
    a housing; and
    a multi-dimensional seismic sensor array coupled with the Ocean Bottom Node, wherein the multi-dimensional seismic sensor array is configured to acquire ultra-long seismic survey data, wherein ultra-long seismic survey data includes data having an offset greater than 20 km, wherein the multi-dimensional sensor array includes at least one of a pressure sensor, a vertical geophone, a horizontal geophone, a recording system, and one or more accelerometers configured to measure the acceleration of particle velocity in a plurality of directions.

* * * * *